United States Patent
Aguilera et al.

(10) Patent No.: US 7,647,454 B2
(45) Date of Patent: Jan. 12, 2010

(54) TRANSACTIONAL SHARED MEMORY SYSTEM AND METHOD OF CONTROL

(75) Inventors: Marcos K. Aguilera, Palo Alto, CA (US); Christos Karamanolis, Palo Alto, CA (US); Arif Merchant, Palo Alto, CA (US); Mehul A. Shah, Palo Alto, CA (US); Alistair Veitch, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 708 days.

(21) Appl. No.: 11/450,987

(22) Filed: Jun. 12, 2006

(65) Prior Publication Data

US 2007/0288587 A1    Dec. 13, 2007

(51) Int. Cl.
G06F 12/00 (2006.01)
G06F 13/00 (2006.01)
G06F 13/28 (2006.01)
G06F 15/167 (2006.01)

(52) U.S. Cl. .................. 711/147; 711/152; 711/154; 709/214

(58) Field of Classification Search .................. 711/147
See application file for complete search history.

(56) References Cited

U.S. PATENT DOCUMENTS

| | | | | |
|---|---|---|---|---|
| 4,574,350 | A * | 3/1986 | Starr | 710/200 |
| 5,909,574 | A | 6/1999 | Meyer | |
| 6,009,426 | A | 12/1999 | Jouenne | |
| 6,360,231 | B1 * | 3/2002 | Pong et al. | 707/201 |
| 6,467,011 | B2 | 10/2002 | Scardamalia et al. | |
| 6,523,066 | B1 * | 2/2003 | Montroy et al. | 709/229 |
| 6,816,947 | B1 | 11/2004 | Huffman | |
| 6,990,516 | B2 | 1/2006 | Chen | |
| 2006/0161740 | A1 * | 7/2006 | Kottapalli et al. | 711/152 |
| 2007/0186056 | A1 * | 8/2007 | Saha et al. | 711/144 |

FOREIGN PATENT DOCUMENTS

| | | |
|---|---|---|
| EP | 0772136 | 5/1997 |
| WO | 8808571 | 11/1988 |
| WO | 0131458 | 5/2001 |

OTHER PUBLICATIONS

EP 07252277 Search Report dated Aug. 5, 2009 (9 pages).

* cited by examiner

*Primary Examiner*—Christian P Chace
*Assistant Examiner*—Ryan Bertram

(57) ABSTRACT

A transactional shared memory system has a plurality of discrete application nodes; a plurality of discrete memory nodes; a network interconnecting the application nodes and the memory nodes, and a controller for directing transactions in a distributed system utilizing the shared memory. The memory nodes collectively provide an address space of shared memory that is provided to the application nodes via the network. The controller has instructions to transfer a batched transaction instruction set from an application node to at least one memory node. This instruction set includes one or more write, compare and read instruction subsets, and/or combinations thereof. At least one subset has a valid non null memory node identifier and memory address range. The memory node identifier may be indicated by the memory address range. The controller controls the memory node responsive to receipt of the batched transaction instruction set, to safeguard the associated memory address range during execution of the transaction instruction set. The batched transaction instruction set is collectively executed atomically. A notification instruction set may also be used to establish a notification, triggered upon a subsequent write event upon at least a portion of a specified address range.

24 Claims, 5 Drawing Sheets

TRANSACTIONAL SHARED MEMORY SYSTEM AND METHOD OF CONTROL

FIELD OF THE INVENTION

The present invention relates generally to the field of distributed computer systems and methods for controlling transactions in a distributed system environment.

BACKGROUND

Networked computer systems are becoming increasingly popular as they permit different computers to share information. Very often in a network, some systems and their resources are not as highly utilized as other systems on the network, and so there has been interest in developing distributed applications to better utilize the available resources within a network.

Designing distributed applications such as, for example, memory systems, file systems and lock managers is difficult for a variety of reasons. These, for example, include issues of consistency of the distributed state, the reliability and availability of data in the face of node, link or other component failure, and scalability. A node is generally a device that is connected as part of a computer network. Not to the exclusion of other devices, as used herein a node is generally understood and appreciated to be a computer.

With respect to memory, memory for a computer system is technically any form of electronic, magnetic or optical storage; however it is generally divided up into different categories based in part upon speed and functionality. One category is mass storage—typically permanent, non-volatile memory stores which are generally understood to be cheap, slow, and large capacity devices such as hard drives, tape drives, optical media and other mass storage devices. The primary object of mass storage devices is to store an application or data until it is required for execution. With low cost and a non-volatile nature, mass storage devices typically provide a computer system with memory stores ranging to the hundreds of gigabytes. These mass storage devices operate with access times generally in excess of one millisecond.

A second general category is application memory and it is intended to permit quick access for processing, and is connected by a memory bus directly to the computer's processor. In contrast to the relatively slow storage memory, the main memory is generally comprised of fast, expensive volatile random access memory (RAM) with access times generally less than one hundred nanoseconds. Due to high cost and the volatile nature requiring continuous power, main memory RAM is typically provided in a size range from a few tens of megabytes to several gigabytes.

With distributed systems, the distinction between mass storage memory and main memory can be, and often is, blurred in the effort to capitalize on unused resources in the network environment. A number of different systems and methods are known and currently implemented in a variety of forms, in efforts to provide distributed systems.

For example, databases systems are well known and widely employed as a means to centralize and coordinate the storage of information. However, databases are not commonly used for applications that would traditionally be executed in main memory as they are slow and access commands are orders of magnitude less efficient. As their primary function is data storage, databases provide broad sets of functions, which in turn impose additional overhead for operation and interaction. As an example case in point, relational databases require data to be stored in tables and then manipulated by relational algebra operators. This is very different from traditional interactions with memory in which the application processing is actually occurring, and as such, database systems are not truly applicable for use as application memory.

Another example is a network file system, which again is primarily oriented towards providing network storage systems. A network file system typically involves a centralized server to control all access transactions between application nodes and the data stored in the file system. With a single point of access, a network file system can and often does succumb to issues of overload and forced latency as the centralized server attempts to respond to more requests than it can manage at any one point. The centralized server is also a single point of failure which, upon failing, renders the entire network file system unusable.

A distributed file system provides better scalability and access control than a network file system, but again is primarily focused upon providing the storage and retrieval of data from mass storage devices for use in application memory. Disk arrays and storage area networks are also increasing in their frequency of use within networks, but again their principle function is as mass storage, not application memory. In addition, there is typically little if any support for simultaneous write operations performed by multiple nodes to the same data.

Shared memory systems provide an abstraction of reading and writing to a location in a shared memory environment, e.g., a shared application memory environment. Specifically, multiple processors utilize a shared memory environment as a way to communicate and maintain synchronization. Typically, such a system is limited to a small set of nodes and enjoys short physical distances between the nodes.

Distributed shared memory systems are yet another example. Typically, in a distributed shared memory system the nodes communicate with messages. The nodes are not differentiated such that a node being used for the processing of an application may also provide memory resources to other nodes in the network. This has the negative impact that if the processor is busy processing an application task, its shared memory access time will slow until the processor becomes free from the application task.

In addition, in a shared memory environment it is often extremely important to control write operations in such a way that other nodes do not inadvertently receive partial data or data believed to be current when in fact it is being rewritten. Methods to impose such control and conditionality are frequently quite complex, thus imposing additional overhead resources and latency issues upon the system.

Hence, there is a need for a networked transactional memory system and method for directing transactions in such a distributed system that overcomes one or more of the drawbacks identified above.

DETAILED DESCRIPTION

Before proceeding with the detailed description, it is to be appreciated that the present teaching is by way of example only, not by limitation. The concepts herein are not limited to use or application with a specific system or method for a network transactional shared memory and/or a control process for directing transactions in a distributed system environment. Thus, although the instrumentalities described herein are for the convenience 155 of explanation, shown and described with respect to exemplary embodiments, it will be appreciated that the principles herein may be applied equally in other types of systems and methods involving distributed systems and/or transactional shared memory.

Figure 1:
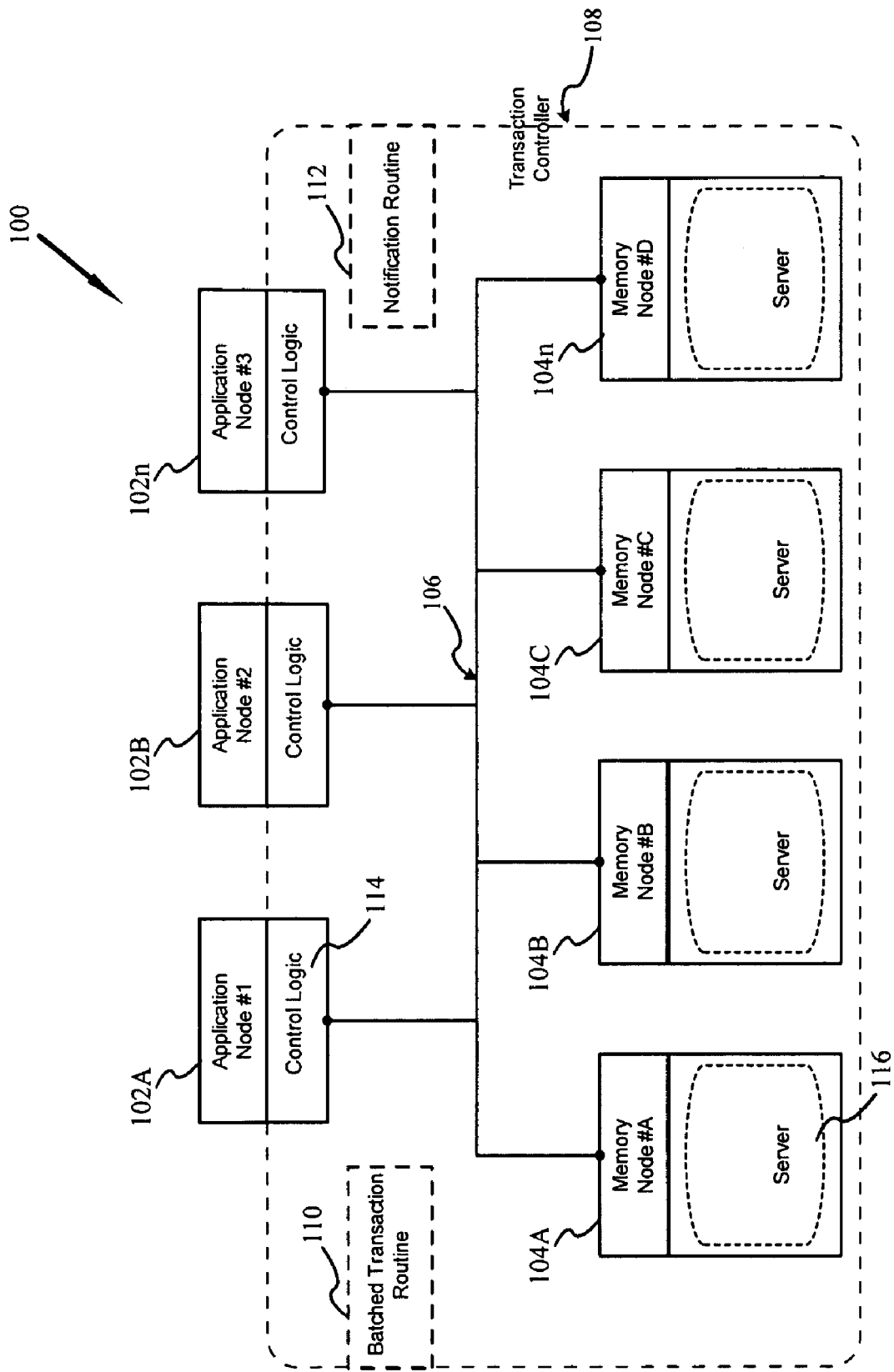
FIG. 1 is a block diagram of a transactional shared memory system in accordance with an embodiment.

FIG. 1 is a high level block diagram of a transactional shared memory system ("TSMS") 100 in accordance with at least one embodiment. As shown, the TSMS 100 generally consists of a plurality of application nodes 102 (of which 102A~102n are exemplary), a plurality of memory nodes 104 (of which 104A~104n are exemplary) interconnected by a network 106, and a transaction controller 108. As a distributed system, the application nodes 102 and the memory nodes 104 are interconnected by a network.

In at least one embodiment, application nodes 102 are understood and appreciated to be systems such as might be used by a human operator or by some software system. More specifically, application nodes 102 are systems which are capable of and intended for use in processing applications as may be desired by a user or by some software system. Application nodes 102 may be commercially available computer systems such as desktop or laptop systems provided by HP, IBM, Dell Computers, Gateway, Apple, Sun Micro Systems, or other computer system providers.

Memory nodes 104 are network attached devices providing random access memory (RAM) and/or disk space (for storage and as virtual RAM) and/or some other form of storage such as tapes, MEMS, optical disks or the like, for use by the application nodes 102 in processing applications. Memory nodes 104 may also be commercially available computer systems such as desktop or laptop systems as provided by HP, IBM, Dell Computers, Gateway, Apple, Sun Micro Systems, or other computer system providers, and combinations thereof. Typically, the memory nodes will be equipped with larger amounts of RAM and/or disk space than are the application nodes 102. Memory nodes may also be more specialized devices such as network disk drives or disk drive arrays, (e.g., RAID), high speed tape, MRAM systems or other devices, and combinations thereof.

Moreover, whereas in a shared memory system or a distributed memory system the networked nodes are not differentiated to be either application nodes or memory nodes, as implied by the figures, memory nodes 104 and application nodes 102 are distinct in at least one embodiment. In other words, in at least one embodiment the application nodes 102 and memory nodes 104 are discrete elements. In certain embodiments, at least some application nodes 102 and memory nodes 104 may be co-located such as in a rack or even within the same system box. However, it is understood and appreciated that at least one application node 102 is logically separate from at least one other memory node 104. Further, in at least one embodiment at least one application node 102 is physically separate from at least one memory node 104.

The transaction controller 108 is operable to permit the application nodes 102 to interact with the memory nodes 104 atomically. Atomic transactions are guaranteed to have either of two outcomes—either complete success (commitment) or complete failure (rollback so there is no commitment), and when multiple processes attempt to perform conflicting atomic transactions simultaneously, their atomic nature guarantees that the transactions that succeed are serializable, meaning that they appear to execute one after the other without intermingling. Guaranteeing atomic transactions frees the programmer from concerns over partial updates occurring, which could lead to corruption of data and/or an errant view of the data. Moreover, to interact atomically is to interact via atomic transactions, such that each interaction either is or is not completely successful.

In addition, in at least one embodiment, the transaction controller 108 permits each application node 102 to address the collective memory pool established by the plurality of memory nodes 104 as a linear memory address space. The transaction controller 108 typically provides two routines: a batched transaction routine 110 and a notification routine 112. Simply stated, the batched transaction routine 110 is operable to assemble batched transaction instruction sets, further described below, which permit the advantageous atomic interaction between the application nodes 102 and the memory nodes 104. The notification routine 112 is operable to assemble notification instruction sets, further described below, which advantageously permit an application node to be informed of a change in data maintained by one or more memory nodes. So as to permit independent operation of the plurality of application nodes 102 without need for a centralized controller or gateway, multiple instantiations of the batched transaction routine 110 and the notification routine 112 may be established within TSMS 100 at any given time.

In at least one embodiment, the transaction controller 108 is implemented as a method stored on a computer-readable medium as a computer program. The form of the medium and the language of the program are understood to be appropriate for the application nodes 102 and memory nodes 104.

When executed in TSMS 100, the computer program will establish the transaction controller 108 and perform the method of directing transactions in the shared memory environment. Specifically, in at least one method of implementation, the transaction controller 108 has two parts, a control logic 114 which is available to the applications at the application nodes 102, and a server 116 that runs on the memory nodes 104. It is understood and appreciated that the control logic 114 may be a user library, or implemented in an operating system kernel, or implemented in hardware. In at least one embodiment the control logic 114 is implanted as a user library.

The control logic 114 implements the ability for application nodes 102 to establish batched transaction instruction sets through the batched transaction routine 110. It also tracks memory node configuration and may provide support for recovery. The server 116 reacts to batched transaction instruction sets as established by an application node 102 via the control logic 114. For the sake of simplicity, in at least one embodiment the server 116 may simply be considered the memory node 104.

In at least one embodiment, the memory nodes 104 are passive entities that simply wait for requests from the application nodes 102. The memory nodes 104 can easily be made fault tolerant by using existing replication, disk logging and disk imaging systems and methods. Replication provides high availability when few memory nodes 104 crash and the maximum number of memory node crashes tolerated in TSMS 100 depend on the degree of replication.

Disk imaging/logging are techniques well understood and employed in traditional database systems. One or both techniques are borrowed in TSMS 100 in at least one embodiment, to provide data durability when many (potentially all) memory nodes 104 crash due to power failures or similar correlated failures. With disk logging for example, the log is written sequentially and disk bandwidth is used efficiently. Specifically, during idle periods, the log file is flushed into a disk image of the memory.

In at least one embodiment, the degree of replication, disk imaging and/or disk logging that is performed can be user adjusted so as to permit user selected tradeoffs between fault tolerance for costs (e.g., slow access and/or hardware expenses) and efficiency (e.g., faster access and/or fewer hardware expenses). TSMS 100 is also scalable, as additional memory nodes 104 may be added to increase the memory available to the application nodes 102.

Figure 2:
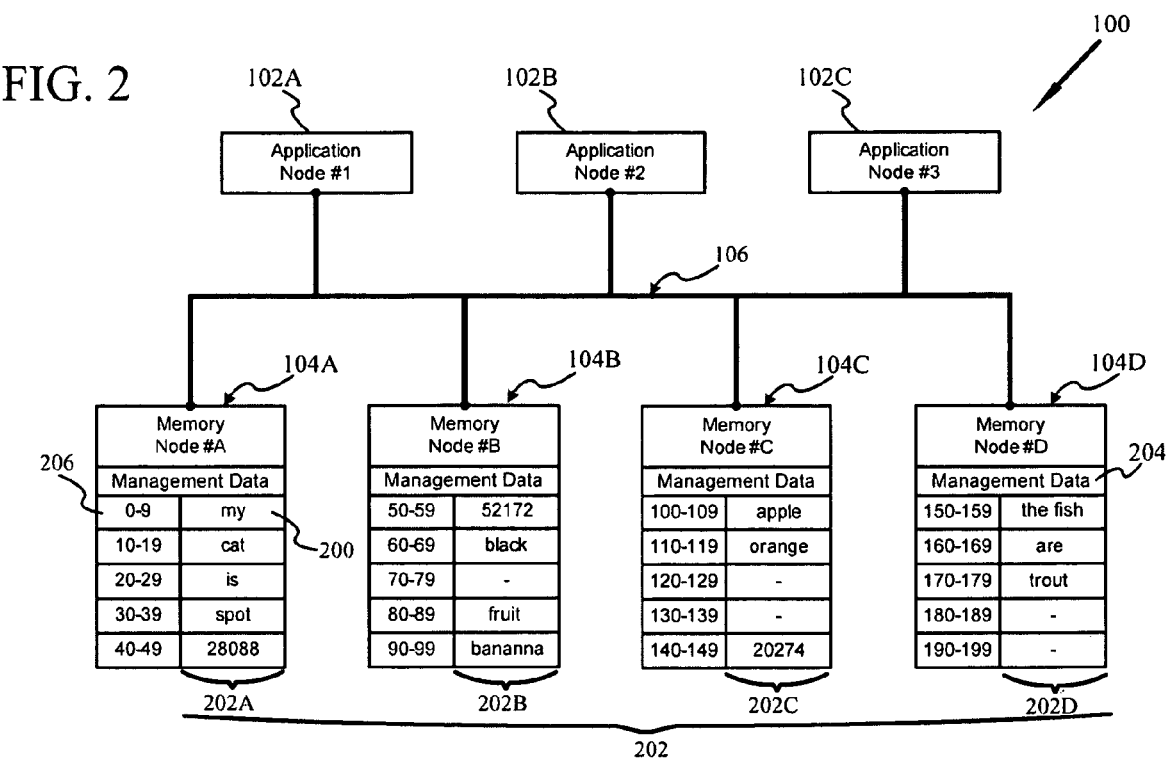
FIG. 2 is an alternative conceptual view of the transactional shared memory system as shown in FIG. 1 in accordance with an embodiment.

FIG. 2 provides a refined conceptual view of TSMS 100 consisting of three application nodes 102A~102C interconnected by network 106 to four memory nodes 104A~104D. It is of course understood and appreciated that TSMS 100 may consist of many more nodes, however FIG. 2 has been rendered for ease of description and illustration.

As shown, each memory node 104 provides a sequence of raw or uninterrupted words 200 of a predetermined standard size, such as for example eight, thirty-two or sixty-four bits, or five hundred twelve bytes. In at least one embodiment, the word spaces have eight bits. Each memory node 104 also has an allocation space for management data 204. It is here that management data, such as the data need by or used by the server 116 of the transaction controller 108, resides on each memory node 104. Further, management data 204 may also harbor notification transaction instruction sets as further described below.

It is understood and appreciated that there are different ways to organize the address space 202. FIG. 2 provides at least one organizational strategy however it is understood and appreciated that such an example is not a limitation. Moreover, for example, each memory node could start its address with a zero "0" and use the memory node identifier to distinguish addresses in different memory nodes.

In at least one example, words 200 are organized as an address space 202, and in at least one embodiment, this is a linear address space which is an integer range. Within TSMS 100, data can be globally referenced by an address pair, such as for example, (mem-id, address), where "mem-id" is the identifier of a specific memory node 104 (e.g., a specific memory node host name or identifier) and "address" is a number 206 within the address space (e.g., address space 202A) of the specified memory node 104 (e.g., memory node 104A).

With respect to FIG. 2, exemplary data is provided in some words 200. This data is depicted as human readable text for ease of illustration and discussion. In addition, each textual entry is entirely allocated within a word space. It is appreciated that data, whether binary, hexadecimal, textual or other, may span two or more words 200. Further, the exemplary data as shown is initial data, to be acted upon by batch transaction instruction sets and notification sets as further described below.

For an embodiment wherein the memory nodes 104 provide an equivalent of RAM or virtual RAM, including but not limited to traditional RAM, DRAM, SRAM, FRAM, MRAM or virtual RAM, the address range is generally understood to be treated as a conventional memory address range. In an alternative embodiment wherein the memory nodes 104 provide memory in the form of a disk or array of disks operating as neither RAM nor virtual RAM, the memory address range is understood and appreciated to be a disk block or range of disk blocks.

Figure 3:
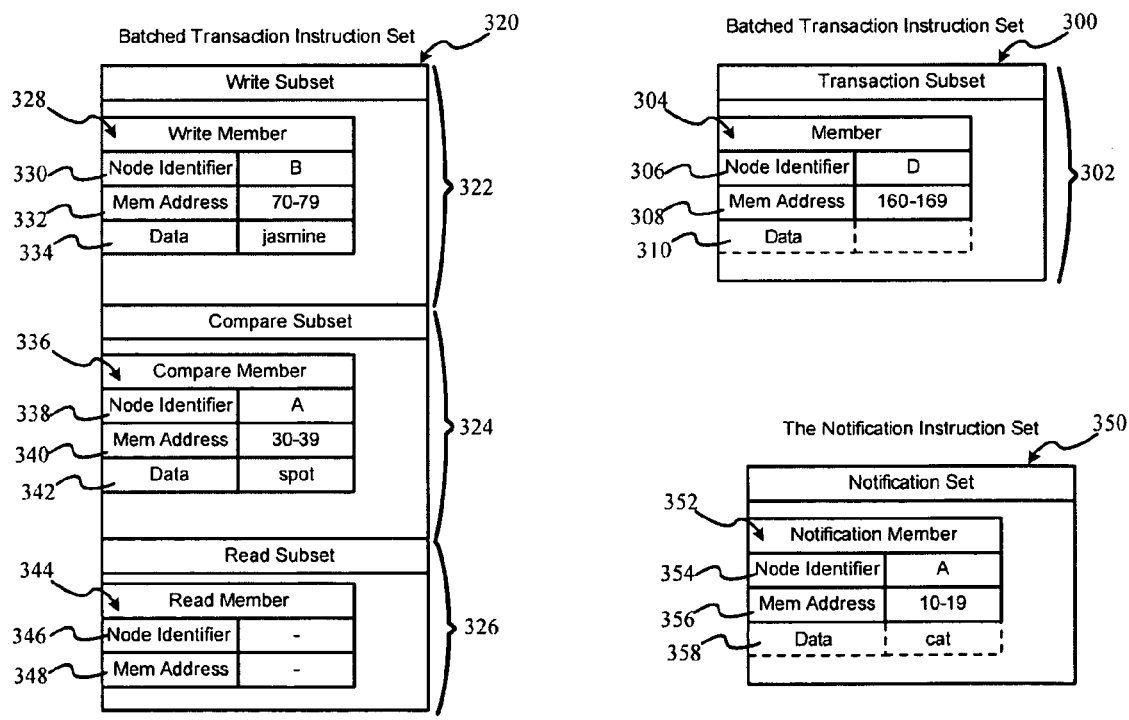
FIG. 3 illustrates the structure of a batched transaction instruction set and a notification transaction instruction set according to an embodiment.

FIG. 3 illustrates the structural form of a batched transaction instruction set 300 for one embodiment, a batched transaction instruction set 320 for an alternative embodiment and a notification transaction instruction set 350 as may be established by the batched transaction routine 110 and notification routine 112 shown in FIG. 1.

The batched transaction instruction set 300 includes at least one subset 302 selected from the group consisting of a write subset, a compare subset, a read subset and combinations thereof. For each included subset there is at least one member 304 providing a valid non-null memory node identifier 306 and memory address range 308. For write and compare members, data 310 are also provided. In at least one embodiment, such as for example where the memory is provided as a linear address space, the memory node identifier 306 is determined from the memory address range 308.

In generating the batched transaction instruction set 300 the application node selects the desired subset, e.g. a write subset, and populates the selected subset with at least one member, e.g., a write member. To accommodate additional alternative members the application may add additional subsets (e.g., compare and/or read) to the batched transaction instruction set 300. In at least one embodiment, batched transaction instruction set 300 includes only write subset members. Further, in at least one alternative embodiment, batched transaction instruction set 300 includes only write subset and compare subset members. Moreover the presence of a read member is not required to establish a valid batched transaction instruction set 300.

In at least one alternative embodiment, the structure of the batched transaction instruction set 320 is pre-established to provide a shell structure for a write subset 322, a compare subset 324 and a read subset 326, into which valid members are added. A non-valid member is one having null for the memory address and memory address range, which effectively results in an empty subset. Use of the pre-defined shell structure may in certain embodiments be advantageous in reducing overhead for the assembly of batched transaction instruction subset 300.

Moreover as shown in batched transaction instruction set 320, the write subset 322 has at least one write member 328 specifying a memory node identifier 330, a memory address range 332 and write data 334. The compare subset 324 has at least one compare member 336 specifying a memory node identifier 338, a memory address range 340 and compare data 342. The read subset 326 has at least one read member 344 specifying a memory node identifier 346 and a memory address range 348.

Similarly, the notification transaction instruction set 350 has at least one notification member 352 specifying a memory node identifier 354 and a memory address range 356. The notification member 352 may also optionally provide compare data 358. The notification transaction instruction set 350 may also specify the originating application node 102, however in at least one embodiment the identity of the originating application node 102 and thus the application node to receive the notification is implicitly conveyed as part of the notification transaction.

Moreover, in at least one embodiment, the batched transaction instruction set 320 is a pre-defined transaction structure providing three distinct and pre-defined subsets (e.g., write subset 322, compare subset 324 and read subset 326). It is further appreciated that each subset may have multiple members. Further, at least one member has a valid non null memory node identifier and a non null memory address range. In other words, a particular batched transaction instruction set 320 may include one write member 328 having a valid non null memory node identifier and a memory address range whereas the compare subset 324 and read subset 326 are effectively empty as their members provide a memory node identifier and address range of null, or members are simply not provided leaving the subset empty. In an alternative embodiment, the batched transaction instruction set may include one or more valid write members, and/or one or more valid compare members, and no valid read members.

The adoption of the three tier structure for the batched transaction instruction set 320 advantageously simplifies the programming overhead for both the assembly of the batched transaction instruction set 320 and the interpretation of the batched transaction instruction set 320. Further, by providing all member subsets within the same batched transaction, the three tiered structure advantageously allows atomic execution of any valid members without intermingling of transactions from other application nodes.

With respect to the example batched transaction instruction set 320 as shown, a valid write member 328 and a valid compare member 336 are shown. Simply stated, this batched transaction instruction set 320 directs memory node A (104A) to compare the memory address 30-39 for the data "spot", and directs memory node B (104B) to write the memory address 70-79 with the data "jasmine". As is more fully described below, in at least one embodiment, the execution of the write member 328 is contingent upon a positive evaluation of the compare member 336.

Figure 4:
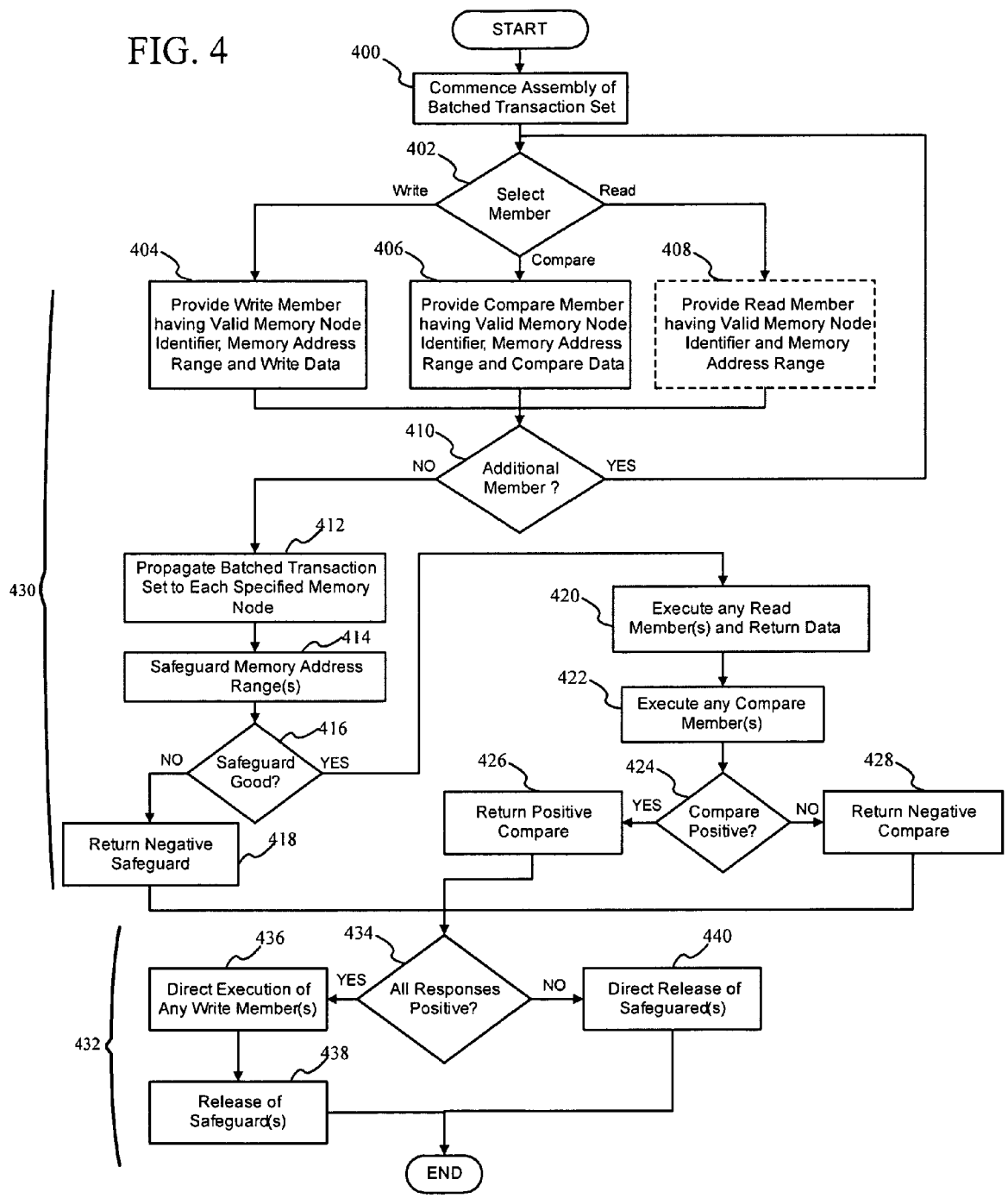
FIG. 4 is a flow diagram illustrating a method of directing transactions the transactional shared memory system as shown in FIGS. 1 and 2 in accordance with an embodiment.
Figure 5:
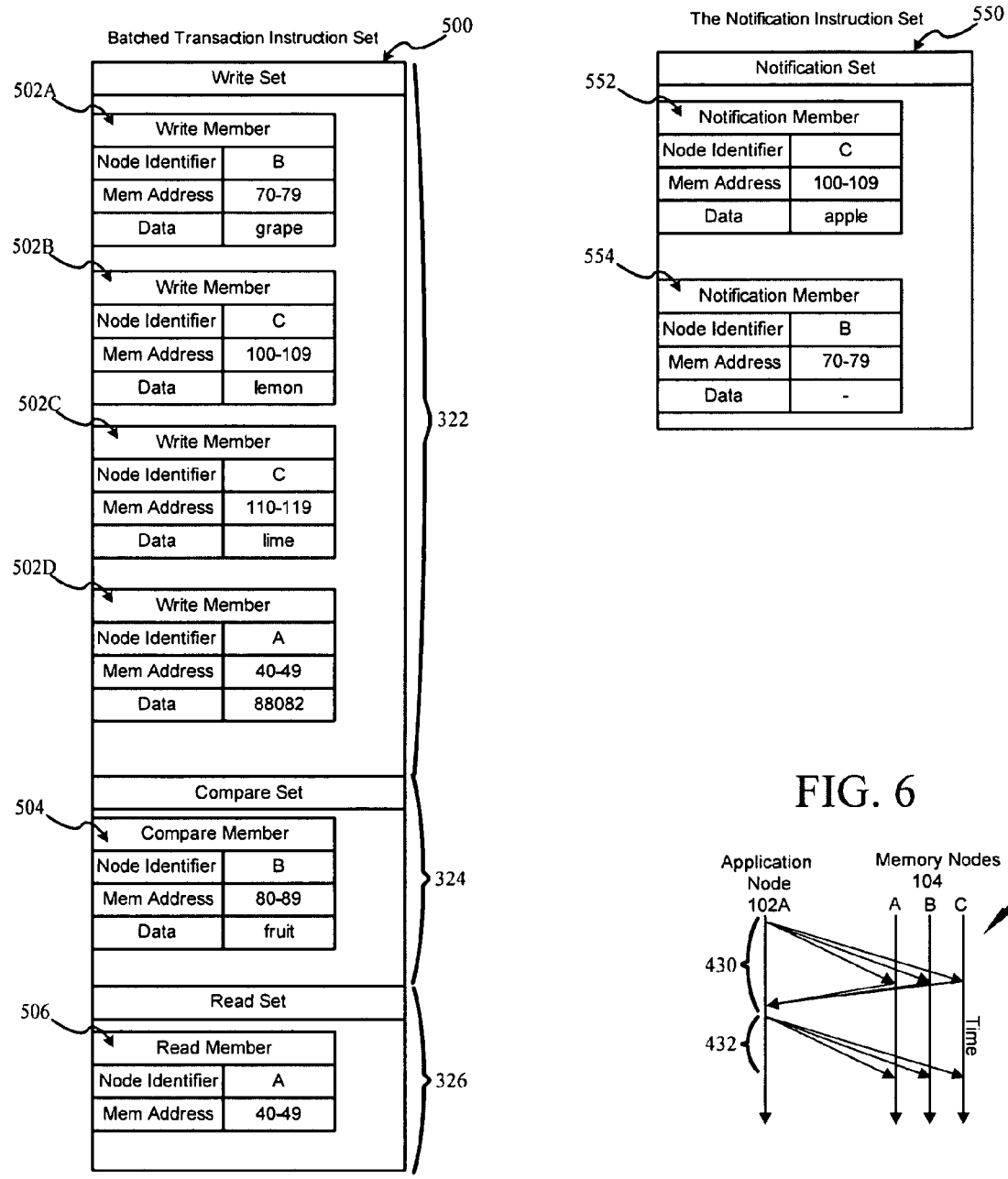
FIG. 5 illustrates an example batched transaction instruction set and notification transaction instruction set in accordance with an embodiment.

FIG. 4 is a high level flow diagram, which in connection with FIGS. 2 and 5 illustrates at least one embodiment for directing transactions within TSMS 100. It will be appreciated that the described method need not be performed in the order in which it is herein described, but that this description is merely exemplary of one method of directing transactions within TSMS 100. In addition, the actions as illustrated may be subdivided and/or combined. Moreover, FIG. 4 has been created for ease of discussion and illustration.

For the sake of example, application node 102A is processing an application involving data stored in memory that is spread across memory nodes 104A~104C. Likewise application nodes 102B and 102C may also be processing applications involving data stored in memory nodes 104A~104C, including memory address ranges used or in use by application node 102A.

As shown in FIG. 4 an application node, such as 102A, commences assembly of a batched transaction instruction set, shown in block 400. The architecture of the batched transaction instruction set is as shown in FIG. 3, as batched transaction instruction set 320 providing three subsections—a write subsection, a compare subsection and a read subsection. The application node selects the appropriate transaction members as between read, write and compare, shown in block 402. It is of course understood and appreciated that as stated above, in at least one embodiment, batched transaction instruction set 300 includes only write subset members. In at least one alternative embodiment, batched transaction instruction set 300 includes only write subset and compare subset members. Moreover the presence of a read member is not required to establish a valid batched transaction instruction set 300, and as such the choice of a read subset block 408 may be entirely omitted (block 408 therefore shown in dotted line).

For the specific example at hand (batched transaction instruction set 500), the application requires a write transaction, and therefore branches to provide a write member, shown in block 404. An evaluation is performed in decision 410 to see if additional transactions are desired. If the case is yes, the method returns to decision 402 for the selection of another transaction member.

The eventual batched transaction instruction set 500 for this example is shown in FIG. 5. As indicated there are four write members, 502A~502D in the write subset 322, one compare member 504 in the compare subset 324, and one read member 506 in the read subset 326. As such, it is appreciated that the method shown in FIG. 4 will cycle between decisions 402 and 410 and actions 404, 406 and 408 to establish the transaction members (502A~502D, 504, 506) in the batched transaction instruction set 500 as shown in FIG. 5. With respect to the example of batched transaction set 500, it is understood and appreciated that a write member or a compare member may include a memory address range including a plurality of words. In the instance example the illustrated data has been simplified for ease of discussion and illustration, and is not intended as a limitation.

As one may observe in FIG. 5, the batched transaction instruction set 500 contains transaction members with memory node identifiers for three of the four memory nodes (104A~104C) shown in FIG. 2. Recalling that atomic transactions are guaranteed to have either of two outcomes—either complete success or complete failure—by batching the instruction sets together so they are processed collectively, when multiple processes attempt to perform conflicting atomic transactions simultaneously, their atomic nature guarantees that the transactions that succeed are serializable, meaning that they appear to execute one after the other without intermingling. With respect to FIG. 5 and batched transaction instruction set 500, by assembling these six transaction members together as a single batched transaction set, application node 102A is assured of executing the accesses within the memory address space 202 atomically. More specifically, the transaction members are executed in a serialized way with respect to all concurrent batched transactions—all the transaction members either succeed or fail, and such success or failure occurs without intervening operations from other batched transaction sets or independent transaction sets. The atomic nature of the batched transaction is achieved in at least one embodiment by performing the batched transaction instruction set 500 as a two phase protocol, further explained below.

It is, of course, understood and appreciated that access to the memory address space 202 is not likely to be as fast as access to a more traditional memory address space that is provided to a central processing unit (CPU) by a memory bus on a main board supporting both the CPU and the memory address space. It is further understood and appreciated that due to latencies in network communication and traffic, receipt and execution of the batched transaction instruction set 500 by each addressed memory node is likely not to be contemporaneous. The atomic nature of execution permitted by batched transaction instruction set 500 advantageously avoids the issue of both latency and the issue of non contemporaneous execution.

Returning now to the flow diagram of FIG. 4, and with reference to the batched transaction instruction set 500 of FIG. 5, the batched transaction instruction set 500 is propagated to each specified memory node identifier (e.g. memory nodes 104A~104C), as shown in block 412. In at least one embodiment, this propagation is performed with the use of TCP/IP which is well understood and commonly utilized in both WAN and LAN environments. In at least one other embodiment, this propagation is performed with the use of RDMA which is a fast protocol for accessing data remotely. Alternative protocols may also be used. Moreover, the use of existing protocols permits the exchange of information between node elements within the network 106 in a coordinated and reliable manner.

Upon receipt of the batched transaction instruction set 500 by the specified memory nodes 104A~104C, each memory node acts to safeguard the memory address range specified in the relevant transaction members, as shown in block 414. In at least one embodiment, the safeguard is achieved by establishing a lock upon the specified memory address range. This safeguard is imposed upon the memory address range for the duration of the execution of the batched transaction instruction set 500. For example, memory node B (104B) will act to safeguard memory address range 70-89 (for write member 502A and compare member 504), memory node C (104C) will act to safeguard memory address range 100-119 (for write members 502B and 502C), and memory node A (104A) will act to safeguard memory address range 40-49 (for write member 502D and read member 506).

It is appreciated that the entire memory address space 202 is not locked, nor is the portion of the address space provided by each involved memory node (e.g., 202A~202C). Rather, only the specific address ranges specified in the batched transaction instruction set 500 are locked at the granular level pre-determined for the TSMS 100, e.g., word, byte, block or other contiguous sequence of bits. The rest of the address space 202 remains fully available for use by other application nodes.

If the attempt to safeguard the memory range is not successful, decision 416, the memory node responds to the application node that the safeguard is negative, shown in block 418. If the safeguard is positive, decision 416, the memory node will execute any relevant read members and return the data to the application node, shown in block 420. The memory node will also execute any compare members, shown in block 422. The execution of the compare member is evaluated, decision 424. If positive, the memory node responds to the application node that the compare was positive, block 426. If the compare was not positive, the memory node will respond to the application node that the compare was negative, block 428.

With respect to batched transaction instruction set 500, and the condition of the memory address space 202 shown in FIG. 2, and assuming successful safeguards imposed on all relevant memory address ranges, memory node A (104A) returns data 28088 in response to read member 506. Memory node B (104B) compares the data in address range 80-89 with the compare data "fruit" supplied by compare member 504 and returns a positive indicator.

In at least one embodiment, actions 412 through 428 represent phase one 430 of the batched transaction instruction set 500. Moreover, phase one 430 determines from each addressed memory node the ability to safeguard the memory address range and positively evaluate any valid compare members. Phase two 432 operates in response to an affirmative safeguard for all members and the positive evaluation of any compare members to direct the execution of any write members and the release of the safeguards. If any safeguard is negative or any compare evaluation is negative, phase two 432 directs the release of the safeguards.

More specifically, if all responses are positive for safeguards and compares, decision 434, the application node will direct the execution of any write members, shown in block 436 and the subsequent release of the safeguard, shown in block 438. If all responses are not positive for safeguards and compares, decision 434, the application node will direct the release of all safeguards, shown in block 440.

Figure 6:
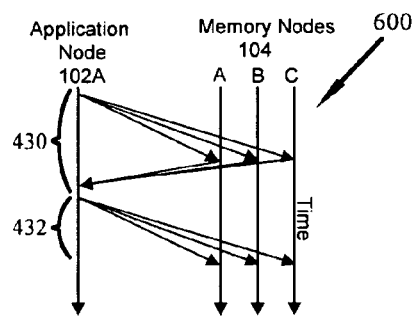
FIG. 6 illustrates a time graph of the method of directing transactions in the transactional shared memory system as shown in FIGS. 1 and 2 in accordance with an embodiment.

FIG. 6 conceptually illustrates phase one 430 and phase two 432 on a time graph 600 for application node 102A and memory nodes 104A~104C. As is shown more clearly, phase one 430 involves the propagation of the batched instruction set from the application node 102A to each of the involved memory nodes 104A~104C, and a response from each memory node back to the application node 102A. Phase two 432 simply involves a transmission from the application node 102A to the memory nodes 104A~104C.

Absent batched transaction instruction set 500, if a compare instruction was performed and evaluated and then a write instruction performed, as in a traditional distributed system, the data upon which the compare was performed could be changed by another application node, and potentially lead to data corruption even if the write transaction was performed atomically. The ability to tie compare and write instructions together atomically as permitted by batched transaction instruction set 500 is highly advantageous.

As illustrated in this example, in at least one embodiment, the write members 502A~502D are executed contingent on a positive evaluation of the compare member 504. Further, the batched transaction instruction set 500 advantageously permits and achieves an atomic write operation upon different memory nodes.

In addition, batched transaction instruction set 500 also illustrates the ability to perform an atomic swap operation. Specifically, a read transaction is performed and before the memory address range is released, a write transaction is performed upon that memory address range.

With respect to batched transaction instruction set 500, and the condition of the memory address space 202 shown in FIG. 2, with respect to write members 502A~502C, memory node B (104B) will write the data "grape" in memory address range 70-79, initially shown as "-" and memory node C (104C) will write the data "lemon" and "lime" into the memory address range 100-119, initially holding "apple" and "orange". In addition write member 502D will direct memory node A (104A) to write the data "88082" into the memory address 40-49, replacing the initial data "28088" read by read member 506.

In the example, shown write member 502D is both a swap operation and an operation conditioned upon the results of compare member 504. It is understood and appreciated that the atomic swap operation achieved with write member 502D and read member 506 need not also involve a compare member.

Shown in FIG. 5 is also a notification transaction instruction set 550 having two notification members 552, 554. Notification transaction instruction set 550 is assembled by an application node. It may be assembled in connection with batched transaction instruction set 500 by application node 102A or by another application node, such as for example application node 102B. For the sake of this example, notification transaction instruction set 550 is understood to be assembled by application node 102B, and is propagated to memory nodes C and D (104C, 104D) prior to the assembly of batched transaction instruction set 500. As such, the notification operations are established with reference to the initial exemplary data provided in FIG. 2.

Figure 7:
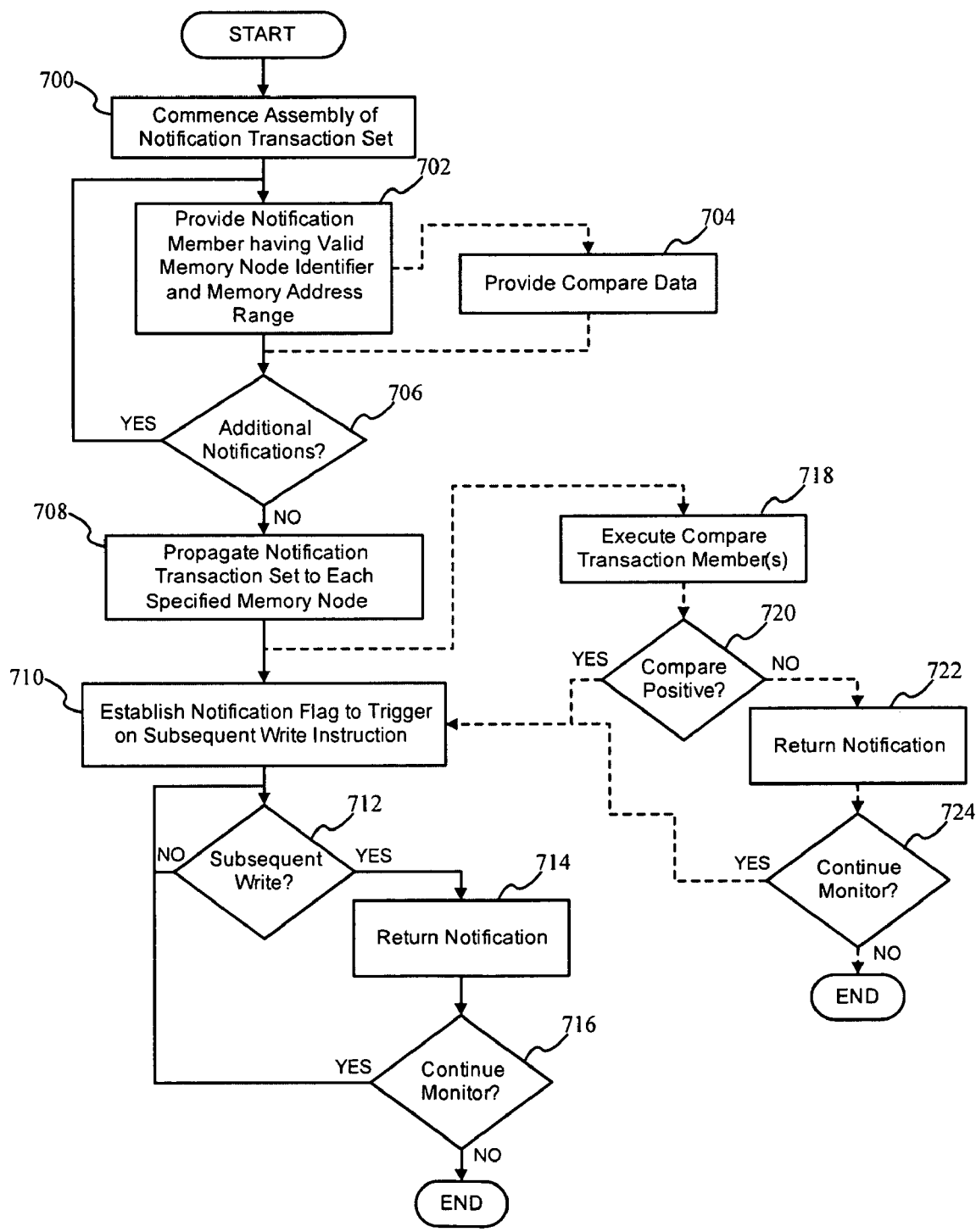
FIG. 7 is a flow diagram illustration a method of directing notifications within the transactional shared memory system as shown in FIGS. 1 and 2 in accordance with an embodiment.

FIG. 7 provides a high level flow diagram which, in connection with FIGS. 2 and 5, illustrates at least one embodiment for implementing a notification transaction instruction set 550 within TSMS 100. As with FIG. 4, it will be appreciated that the described method need not be performed in the order in which it is herein described, but that this description is merely exemplary of one method of directing notifications within TSMS 100. In addition, the actions as illustrated may be subdivided and/or combined. Moreover, FIG. 7 has been created for ease of discussion and illustration.

For the sake of example, application node 102B is assumed to be the application node establishing notification transaction instruction set 550, as it is processing an application involving data stored in memory that is spread between memory nodes 104C and 104D.

As shown in FIG. 7 an application node, such as 102B, commences assembly of a notification transaction instruction set, shown in block 700. The architecture of the notification transaction instruction set is as shown in FIG. 5, wherein the notification transaction instruction set 550 has one or more notification members. Application node 102B provides a notification member 552 having a valid memory node identifier and memory address range, shown in block 702. Application node 102B may also optionally provide data for a compare, as shown in optional block 704.

If additional notifications are desired as well, decision 706, application node 102B provides an additional notification member by returning to block 702. With respect to notification transaction instruction set 550 as shown in FIG. 5, two notification members are evident, 552 and 554. Further, notification member 552 has optional compare data, whereas notification member 554 does not.

If no additional notifications are desired, decision 706, the notification transaction instruction set 550 is propagated to each specified memory node identifier (e.g., memory nodes 104C, 104D), as shown in block 708. As with the propagation of the batched transaction instruction set 500, in at least one embodiment, this propagation is performed with the use of TCP/IP which is well understood and commonly utilized in both WAN and LAN environments. Alternative protocols may also be used. Moreover, the use of existing protocols permits the exchange of information between node elements within the network 106 in a reliable manner.

Upon receipt of the notification transaction instruction set 550 by the specified memory nodes 104C, 104D, each memory node establishes a notification flag to trigger on a subsequent write event involving a memory address range that includes at least part of the memory address range indicated by the notification member, block 710. This write event may occur as the result of a subsequent batched transaction instruction set providing a valid write member, or even a traditional write instruction provided without the structure of a batched transaction instruction set.

In at least one embodiment, this flag(s) is established in the management data 204 of each memory node 104. Various types of flags are known and implemented to note an event within a system, such as a write instruction. The type of flag established will be determined by the operating system employed and/or control system present for each memory node 104.

Upon receipt of a subsequent write transaction, decision 712, the flag is tripped and the memory node will send a notification to the application node 102B, step 714. In at least one embodiment, the flag established by the notification member will expire upon the sending of a notification that a write operation has been performed upon at least a portion of the indicated memory address, decision 716. In at least one alternative embodiment, the flag is persistent until removed, and thus the method cycles back to await the occurrence of additional write operations, decision 712.

With respect to the notification transaction instruction set 550, and specifically notification member 554, memory node B (104B) establishes a flag to trigger upon subsequent write transactions directed at memory address ranges involving at least a portion of memory address range 70-79. As batched transaction instruction set 500 includes write member 502A that involves this memory address range, the notification flag will be triggered. In at least one embodiment, the triggering of the notification flag will occur if and only if phase two 432 of the batched transaction instruction set 500 directs an execution of the write member 502A. Notifications, such as those established by notification transaction instruction set 550 are advantageous for several reasons such as, for example, they decrease consumption of resources (e.g. network bandwidth and CPU time) that would otherwise be incurred by polling the memory node to see if an event of interest had occurred.

Where optional compare data is provided as an element of the notification member, e.g., notification member 552, upon receipt of the notification transaction instruction set 550, and specifically the relevant notification member (e.g., 552), the memory node will perform an immediate compare of the provided data, shown in block 718. If the compare is positive, decision 720, the method continues with the establishment of the flag, as shown in block 710.

If the compare is negative, decision 720, a notification is immediately returned to application node 102B, shown in block 722. In at least one embodiment, it is still desired to establish a flag to monitor for subsequent write transactions, decision 724. In such embodiments the method continues with the establishment of the flag, as shown in block 710.

With respect to the notification transaction instruction set 550, and specifically notification member 552, memory node C (104C) compares the provided data "apple" with the data found in memory address range 100-109, also initially containing "apple". As the compare is positive, the memory node 104C establishes a flag to trigger upon the subsequent receipt of a write transaction that involves at least a part of address range 100-109. As batched transaction instruction set 500 includes write member 502B that involves this memory address range, the notification flag will be triggered. In at least one embodiment, the triggering of the notification flag will occur if and only if phase two 432 of the batched transaction instruction set 500 directs an execution of the write member 502B.

It is understood and appreciated that in at least one alternative embodiment, write transactions may occur within TSMS 100 without utilizing a batched transaction instruction set 320. Indeed, read transactions and compare transactions may also be performed without utilizing a batched transaction instruction set 320. In the event of such a write event, notification transaction instruction set 550 will still respond should the write transaction involve at least a portion of the memory address range upon which the flag is based.

Moreover, with respect to the above descriptions and figures, TSMS 100 is understood and appreciated to permit distributed application processing in a networked environment 106. In at least one embodiment, the memory nodes 104 need not be close together and may not be homogeneous in that they may vary in terms of hardware, resources, configuration, network access, and or other factors and combinations thereof. In at least one embodiment the same is true for the application nodes 102 as well.

So long as they are connected to the network, the memory nodes 104 need not be in a visible or easily accessible place. They may be buried, in space, on airplanes, underwater, in submarines, inside a living organism, within portable devices such as cell phones or PDAs, and other locations. Further, the memory nodes 104 may take many forms. As stated above, they may be non-volatile devices, disk arrays or the like, but they may also be established as integrated circuits or a chemical mixture having behavior that includes or approximates an electronic circuit. The memory nodes 104 may also be another physical system whose behavior includes or approximates an electronic circuit. Further still, the memory nodes 104 may be combinations of organic matter and electronics that interact to provide a behavior that includes or approximates an electronic circuit. Moreover, the memory nodes 104 are understood and appreciated to be storage devices which may be selected based on application need or preference, which are then provided to the application nodes by a network.

The TSMS 100 may utilize a traditional network such as a WAN or LAN (wired or wireless) operating at conventional speeds, or it may utilize an optical fiber network to enjoy faster response times. However, the latency of the network is not a significant issue and the batched transaction instruction set 320 advantageously permits desired transactions to be collectively executed atomically. Moreover, the network interconnecting the memory nodes 104 and the application nodes 102 can be any medium, device or mechanism that allows the nodes to communication. Further, the network connecting the memory nodes 104 and the application nodes 102 need not be homogeneous, and need not be unique in that there may be multiple networks connecting them together, each potentially having different characteristics. For example one network may be established with physical wire and a second network may be established with radio transmission. Indeed, portions of the network or networks may have different bandwidths, latencies, packet sizes, access mechanisms, reliability protocols, and ordering guarantees.

Further, this atomic behavior may advantageously involve discrete memory nodes 104. As such, in at least one embodiment TSMS 100 may enjoy scalability, load balancing, and memory distribution not available with conventional database systems, network file systems, distributed memory systems or shared memory systems Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A transactional shared memory system, comprising:
   a plurality of discrete application nodes;
   a plurality of discrete memory nodes collectively providing an address space of shared memory;
   a network interconnecting the plurality of discrete application nodes and the plurality of discrete memory nodes, such that the address space is available to the application nodes; and
   a controller for directing transactions in a distributed system utilizing the shared memory, comprising instructions to permit an application node to transfer to at least one memory node a batched transaction instruction set including instruction subsets selected from the group consisting of:
      a write subset having at least one write member specifying a memory node identifier, a memory address range, and write data;
      a compare subset having at least one compare member specifying a memory node identifier, a memory address range, and compare data;
      a read subset having at least one read member specifying a memory node identifier, and a memory address range; and
      combinations of the write, compare and read subsets;
      wherein at least one member has a valid non null memory node identifier and memory address range;
   the controller further comprising instructions to control the memory node responding to receipt of the batched transaction instruction set from an application node to safeguard the one or more provided memory address range for the duration of the execution of the batched transaction instruction set;
   wherein the write subset is collectively executed atomically.

2. The transactional shared memory system of claim 1, wherein for each instruction subset the memory node identifier is indicated by the address range.

3. The transactional shared memory system of claim 1, wherein the address space is a linear address space.

4. The transactional shared memory system of claim 1, wherein the batched transaction instruction set has at least two members, each member specifying a different memory node identifier.

5. The transactional shared memory system of claim 1, wherein a single batched transaction instruction set permits an atomic write operation upon different memory nodes.

6. The transactional shared memory system of claim 1, wherein the write members are executed in response to a positive evaluation of the compare members.

7. The transactional shared memory system of claim 1, wherein the batched transaction instruction set is operable as a two phase protocol;
   phase one determining from each addressed memory node the ability to safeguard the one or more provided memory address range and positively evaluate any valid compare members; and
   phase two, in response to an affirmative safeguard and a positive evaluation of any valid compare members, directing the execution of any write members and the release of the safeguard, phase two otherwise directing the release of the safeguard.

8. The transactional shared memory system of claim 1, wherein the memory nodes are selected from the group consisting of at least a disk, disk array, tape drive, and combinations thereof, the memory address range selected from the group consisting of at least a memory block, sector, disk block, range of disk blocks, and combinations thereof.

9. The transactional shared memory system of claim 1, the controller further comprising transaction instructions that are operable to permit an application node to batch, to at least one memory node, a notification transaction instruction set including at least one notification member specifying a memory node identifier, and a first memory address range;
   the memory node responding to receipt of the notification transaction instruction set by establishing a notification flag to send a notification to the application node upon receiving a subsequent write set having a memory address range including at least part of the first memory address range.

10. The transactional shared memory system of claim 9, wherein the notification member further includes query data, the memory node evaluating the query data to the data in the address range and in response to a negative evaluation, sending a notification to the application node.

11. The transactional shared memory system of claim 9, wherein the notification flag is persistent until removed.

12. A method for directing transactions in a distributed system environment having a plurality of memory nodes and a plurality of application nodes located in a network, at least one memory node being separate from at least one other memory node, comprising:
  executing instructions that are operable to permit an application node to transfer, to at least one memory node, a batched transaction instruction set including instruction subsets selected from the group consisting of:
    a write subset having at least one write member specifying a memory node identifier, a memory address range, and write data;
    a compare subset having at least one compare member specifying a memory node identifier, a memory address range, and compare data;
    a read subset having at least one read member specifying a memory node identifier, and a memory address range; and
    combinations of the write, compare and read subsets;
    providing at least one subset having at least one member having a valid non null memory node identifier and memory address range;
  the memory node responding to receipt of the batched transaction instruction set from an application node by safeguarding the one or more provided memory address range for the duration of the execution of the batched transaction instruction set;
  wherein the write subset is collectively executed atomically.

13. The method of claim 12, wherein the batched transaction instruction set has at least two members, each member specifying a different memory node identifier.

14. The method of claim 12, wherein a single batched transaction instruction set permits an atomic write operation upon different memory nodes.

15. The method of claim 12, wherein the write members are executed in response to a positive evaluation of the compare members.

16. The method of claim 12, wherein the batched transaction instruction set is operable as a two phase protocol;
  phase one determining from each addressed memory node the ability to safeguard the one or more provided memory address range and positively evaluate any valid compare members; and
  phase two, in response to an affirmative safeguard and a positive evaluation of any valid compare members, directing the execution of any write members and the release of the safeguard, phase two otherwise directing the release of the safeguard.

17. The method of claim 12, further comprising transaction instructions that are operable to permit an application node to batch to at least one memory node a notification transaction instruction set including at least one notification member specifying a memory node identifier, and a first memory address range;
  the memory node responding to the receipt of the notification transaction instruction set by establishing a notification flag to send a notification to the application node upon receiving a subsequent write set having a memory address range including at least part of the first memory address range.

18. The method of claim 17, wherein the notification member further includes query data, the memory node evaluating the query data to the data in the address range and in response to a negative evaluation, sending a notification to the application node.

19. The method of claim 17, wherein the notification flag is persistent until removed.

20. The method of claim 12, wherein the method is stored on a computer-readable medium as a computer program which, when executed in a computer network having a plurality of application nodes and plurality of memory nodes in networked communication, will perform the method of directing transactions in the shared memory environment.

21. The method of claim 12, wherein the memory nodes are selected from the group consisting of at least a disk, disk array, tape drive, and combinations thereof, the memory address range selected from the group consisting of at least a memory block, sector, disk block, range of disk blocks, and combinations thereof.

22. A computer-readable medium on which is stored a computer program for directing transactions in a distributed system environment, the computer program comprising instructions which, when executed by a computer network having a plurality of application nodes and a plurality of memory nodes, perform the steps of:
  permitting an application node to assemble a batched transaction instruction set including instruction subsets selected from the group consisting of:
    a write subset having at least one write member specifying a memory node identifier, a memory address range, and write data;
    a compare subset having at least one compare member specifying a memory node identifier, a memory address range, and compare data;
    a read subset having at least one read member specifying a memory node identifier, and a memory address range; and
    combinations of the write, compare and read subsets;
    providing at least one subset having at least one member having a valid non null memory node identifier and memory address range;
  propagating the batched transaction instruction set to each specified memory node identifier;
  safeguarding the at least one specified address range upon each addressed memory node;
  reading any memory address range specified in any read member;
  evaluating any non-null compare members as positive or negative; and
  atomically executing any write members and releasing the safeguards if no negative compare evaluations are identified, and aborting all write members if at least one negative compare evaluation is identified.

23. The computer-readable medium of claim 22, further comprising transaction instructions that are operable to permit an application node to batch to at least one memory node a notification transaction instruction set including at least one notification member specifying a memory node identifier, and a first memory address range;
  the memory node responding to the receipt of the notification transaction instruction set by establishing a notification flag to send a notification to the application node upon receiving a subsequent write set having a memory address range including at least part of the first memory address range.

24. The computer-readable medium of claim 22, wherein the batched transaction instruction set is operable as a two phase protocol;

phase one determining from each addressed memory node the ability to safeguard the one or more provided memory address range and positively evaluate any valid compare members; and phase two, in response to an affirmative safeguard and a positive evaluation of any valid compare members, directing the execution of any write members and the release of the safeguard, phase two otherwise directing the release of the safeguard.

* * * * *